(12) United States Patent
Liang et al.

(10) Patent No.: US 11,531,138 B2
(45) Date of Patent: Dec. 20, 2022

(54) PROCESSES AND SYSTEMS FOR CORRELATING WELL LOGGING DATA

(71) Applicant: Schlumberger Technology Corporation, Sugar Land, TX (US)

(72) Inventors: Lin Liang, Belmont, MA (US); Tao Shan, Beijing (CN); Ji Li, Beijing (CN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/237,473

(22) Filed: Apr. 22, 2021

(65) Prior Publication Data

US 2022/0342111 A1     Oct. 27, 2022

(51) Int. Cl.
*G01V 11/00* (2006.01)
*E21B 49/00* (2006.01)
*E21B 49/08* (2006.01)

(52) U.S. Cl.
CPC ............ *G01V 11/002* (2013.01); *E21B 49/00* (2013.01); *E21B 49/087* (2013.01)

(58) Field of Classification Search
CPC ...... G01V 11/002; E21B 49/00; E21B 49/087
See application file for complete search history.

(56) References Cited

U.S. PATENT DOCUMENTS

| | | | | |
|---|---|---|---|---|
| 11,220,898 | B2 * | 1/2022 | Pollack | G01V 1/40 |
| 2021/0372279 | A1 * | 12/2021 | Li | H04Q 9/00 |

OTHER PUBLICATIONS

Williams et al., Quantification of Log-Core Correlation Using the Formation Microscope, 1991, Society of Petroleum Engineers, SPE 23524, pp. 985-994. (Year: 1991).*

Kerzner, M.G., 1984, A solution to the problem of automatic depth matching, Paper SPWLA-1984-W, Transactions, SPWLA 25th Annual Logging Symposium, New Orleans, Louisiana, Jun. 10-13, 1984 (18 pages).

Fang, J., Chen, H., Shultz, A., and Mahmoud, W., 1992, Computer-aided well log correlation, AAPG Bulletin, 76, pp. 307-317.

Le, T., Liang, L., Zimmermann, T., Zeroug, S. and Heliot, D., 2019. A Machine-Learning Framework for Automating Well-Log Depth Matching. Petrophysics, 60(05), pp. 585-595.

(Continued)

*Primary Examiner* — Mischita L Henson (74) *Attorney, Agent, or Firm* — Trevor G. Grove (57) ABSTRACT

Processes and systems for correlating well log data sets from well logging passes within a well bore. In some embodiments, a process for well log depth matching can include normalizing a first well log from a first logging pass obtained within a well bore and a second well log from a second logging pass obtained within the well bore, performing a pre-shift, performing feature picking to identify one or more features along the second well log, performing normalized cross-correlation based optimization between the first well log and the second well log to match the one or more features along the second well log to the same one or more features of the first well log and generating a shift table for depth shifting the one or more features of the second well log and the first well log.

16 Claims, 6 Drawing Sheets

(56) References Cited

OTHER PUBLICATIONS

Zimmermann, T., Liang, L. and Zeroug, S., 2018. Machine-learning-based automatic well-log depth matching. Petrophysics, 59(06), pp. 863-872.
Fu T, Chung F, Luk R, et al. Representing financial time series based on data point importance. Engineering Applications of Artificial Intelligence, 2008, 21(2): 277-300.

* cited by examiner

PROCESSES AND SYSTEMS FOR CORRELATING WELL LOGGING DATA

FIELD

Embodiments disclosed herein generally relate to processes and systems for correlating well log data sets from well logging passes within a well bore.

BACKGROUND

In the upstream oil and gas industry, logging is widely used in hydrocarbon exploration, field development planning, and well completion, to name a few. Log interpretation is utilized for formation evaluation and reservoir characterization. Depth matching well logs acquired from multiple logging passes in a single well has been a long-standing challenge for the industry. It is a part of providing a reliable integrated log interpretation, without which mismatches between well logs leads to erroneous results, especially for thinly laminated formations. Depth matching is also used for other wellbore-related operations, such as perforation, completion, core sampling, formation testing, and drill stem testing, each requiring precise depth positions to ensure successful operations.

Typically, gamma-ray logs from two different logging passes performed in a single well are correlated. The correlation can be performed through depth matching. From the gamma-ray synchronization, other logs generated during each pass can also be synchronized. The existing depth matching approaches employed in commercial platforms are basically variant optimization algorithms based on the cross-correlation and covariance measures of two signals or the dynamic and customized correlations. Examples of optimization algorithms can be found in Kerzner, M. G., 1984, *A solution to the problem of automatic depth matching*, Paper SPWLA-1984-VV, Transactions, SPWLA 25th Annual Logging Symposium, New Orleans, La., 10-13 June. and Fang, J., Chen, H., Shultz, A., and Mahmoud, W., 1992, *Computer-aided well log correlation*, AAPG Bulletin, 76, pp. 307-317. In many cases, these algorithms do not provide accurate depth matching results and need additional and inefficient manual adjustments. These solutions do not satisfy the rising demand to minimize user intervention to proceed towards automated data processing and interpretation.

A machine learning-based solution, as described in Le, T., Liang, L., Zimmermann, T., Zeroug, S. and Heliot, D., 2019, *A Machine-Learning Framework for Automating Well-Log Depth Matching*, Petrophysics, 60(05), pp. 585-595, was developed to address this issue. The proposed solutions included a supervised machine learning approach through a fully connected neural network. The training dataset was obtained by manually labeling a limited set of field data. As it is unrealistic to expect a perfect model from the initial training with limited manually labeled data, this work developed a continuously self-evolving depth matching framework. During the use of depth matching service, this framework allows taking the user input and feedback to further train and improve the depth matching engines. This is facilitated by an automatic quality control (QC) module. This QC module can also be used to assess the quality of the returned results from the depth matching engine. The users review the results and do manual adjustments if some intervals are not ideally depth-matched by the engine. Those manual adjustments are sent back to the database and the framework re-trains the machine learning model based on the updated database. The newly trained model can be validated and compared against existing models using the developed metrics system. Enhanced models are committed to the model pool that is part of the service. As the users keep using the service, the depth matching framework is anticipated to automatically and continuously improve in performance which eventually leads to an optimal and fully automated depth matching service. The limitation of this machine learning-based solution is that it relies on a fully self-evolving mechanism or trained engine requiring significant resources and human intervention before actual well log depth matching can be utilized. Without the trained engine, it would be difficult for the machine learning tool to reach its maturity for acceptable performance.

There is a need, therefore, for processes and systems for robust, automatic, non-machine learning based algorithms and workflows for depth matching gamma-ray logs and/or other well logs measured in multiple logging passes within the same well. Additionally, there is a need for these processes and systems to provide quality control checks for machine learning-based solutions as well as for providing labeled data for the machine-learning algorithm solutions.

SUMMARY

Processes and systems for matching well log depths between two or more well log data sets are provided. In some embodiments, the process can include normalizing a first well log from a first logging pass obtained within a well bore and a second well log from a second logging pass obtained within the well bore. The process can further include performing a pre-shift by calculating a series of correlation coefficients between the first well log and the second well log and utilizing an offset distance corresponding to a highest correlation coefficient as a constant shift value for the second well log. The process can further include performing feature picking to identify one or more features along the second well log. Normalized cross-correlation based optimization can be performed between the first well log and the second well log to match the one or more features along the second well log to the same one or more features of the first well log. A shift table can be generated for depth shifting the one or more features of the second well log to match the depths of the corresponding one or more features in the to first well log. The process can further include applying the generated shift table to the second well log to depth match the second well log to the first well log. The process can further include analyzing geological related data in the depth matched first and second well logs to identify one or more geological structures located along the length of the well bore.

In some embodiments, the system can include a depth matching controller, and instructions that when executed by the depth matching controller cause the depth matching controller to normalize a first well log from a first logging pass obtained within a well bore and a second well log from a second logging pass obtained within the well bore. The instruction can further cause the depth matching controller to perform a pre-shift by calculating a series of correlation coefficients between the first well log and the second well log and utilizing an offset distance corresponding to a highest correlation coefficient as a constant shift value for the second well log. The instruction can further cause the depth matching controller to perform feature picking to identify one or more features along the second well log. The instruction can further cause the depth matching controller to perform a normalized cross-correlation based optimization between the first well log and the second well log to match the one or more features along the second well log to the same one or more features of the first well log, generate a shift table based on the matched one or more features, apply the generated shift table to the second well log to depth match the second well log to the first well log, and analyze geological related data in the depth matched first and second well logs to identify one or more geological structures located along the length of the well bore.

In some embodiments, the process can include normalizing a first well log from a first logging pass obtained within a well bore and a second well log from a second logging pass obtained within the well bore. The process can further include performing a pre-shift by calculating a series of correlation coefficients between the first well log and the second well log and utilizing an offset distance corresponding to a highest correlation coefficient as a constant shift value for the second well log. The process can further include performing feature picking to identify one or more features along the first or second well log. Normalized cross-correlation based optimization can be performed between the first well log and the second well log to match the one or more features along the second well log to the same one or more features of the first well log. A shift table can be generated for depth shifting the one or more features of the second well log to match the depths of the corresponding one or more features in the first well log. The process can further include applying the generated shift table to the second well log to depth match the second well log to the first well log. The process can further include transiting a tool string to a location within the well bore based on geological related data in the depth matched first and second well logs.

BRIEF DESCRIPTION OF THE DRAWINGS

So that the manner in which the above recited features of the present invention can be understood in detail, a more particular description of the invention, briefly summarized above, can be had by reference to embodiments, some of which are illustrated in the appended drawings. It is to be noted, however, that the appended drawings illustrate only typical embodiments of this invention and are therefore not to be considered limiting of its scope, for the invention can admit to other equally effective embodiments.

DETAILED DESCRIPTION

It is to be understood that the following disclosure describes several exemplary embodiments for implementing different features, structures, and/or functions of the invention. Exemplary embodiments of components, arrangements, and configurations are described below to simplify the present disclosure; however, these exemplary embodiments are provided merely as examples and are not intended to limit the scope of the invention. Additionally, the present disclosure can repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the exemplary embodiments presented below can be combined in any combination of ways, i.e., any element from one exemplary embodiment can be used in any other exemplary embodiment, without departing from the scope of the disclosure.

Figure 1:
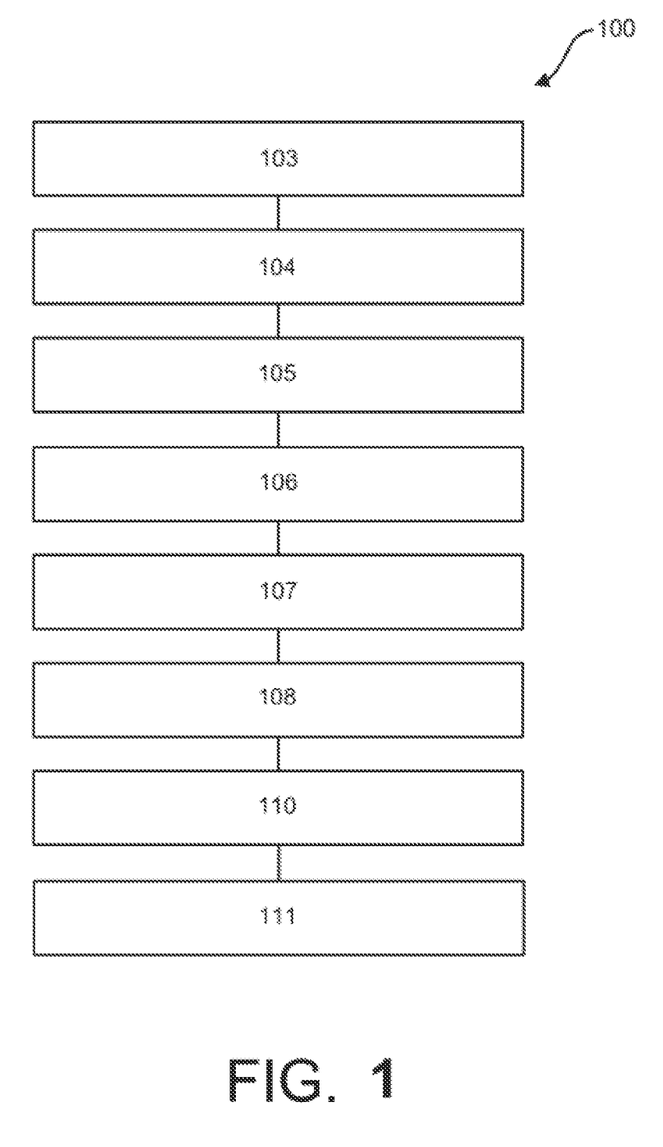
FIG. 1 depicts a flow diagram for an illustrative process for well log depth matching, according to one or more embodiments described.

FIG. 1 depicts a flow diagram for an illustrative process 100 for well log depth matching, according to one or more embodiments. The process 100 can include selecting two well logs as input well logs for depth matching 103, performing data preprocessing 104, performing a pre-shift 105, feature picking 106, shift refinement 107, generating a shift table 108, applying the generated shift table 110 to one or more logs within the well log data taken in the same well log pass, and analyzing the depth matched well logs 111 to assess geological structures or strata to identify hydrocarbon deposits.

Figure 2:
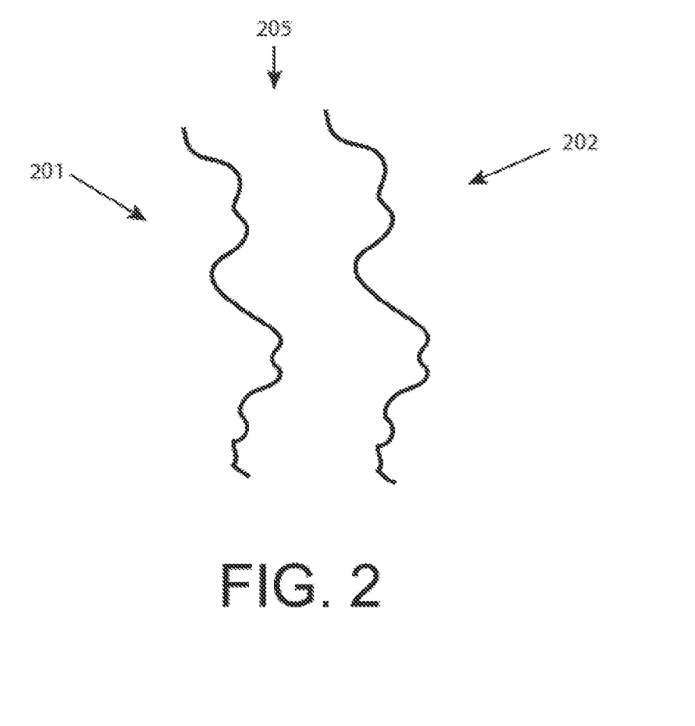
FIG. 2 depicts an illustrative plot of a first well log from a first logging pass in a well bore and an illustrative plot of a second well log from a second logging pass within the well bore, according to one or more embodiments described.

FIG. 2 depicts an illustrative plot of a first well log 201 from a first logging pass in a well bore and an illustrative plot of a second well log 202 from a second logging pass within the well bore, according to one or more embodiments. The first well log 201 and the second well log 202 are plotted with increasing distance or depth along an axis 205 indicative of the distance a well logging device travels within a well bore. In some embodiments, selecting two well logs as input well logs for depth matching 103 can include selecting two or more gamma-ray logs acquired from two or more well logging passes within the well bore. Other types of logs can also be depth matched. For example, a sonic log can be depth matched with a density log or a first sonic log can be depth matched with a second sonic log measured from a different source. For example, the different sources can include a monopole source and a dipole source. Selecting two well logs for depth matching 103 can include the first well log 201 containing data with a relatively strong correlation, either positive or negative, to data from the second well log 202. Selecting two well logs for depth matching 103 can include selecting any two well logs from different well logging passes in the same well bore and can be an automated selection or can be supplied by an external user or selection process. The first well log 201 can be designated as a reference log and the second well log 202 can be designated as a target log or vice versa. The first well log 201 or the second well log 202 can be a depth matched well log that was depth matched in conjunction with a third well log, not depicted. The first well log 201 and the second well log 202 can contain geological related data, including hydrocarbon related data, along with other data taken from the well bore.

In some embodiments, performing the data preprocessing 104 can include resampling each well log to a pre-defined constant rate to normalize the well logs. For example, the resampling rate for each log can be resampled at a two-inch sampling rate. Other constant sampling rates can be used and can include a one-inch sampling rate, a three-inch sampling rate, or larger or smaller sampling rates including sampling rate magnitudes measured in feet, centimeters, yards, or any other units of measure or any other magnitudes. Such normalization can help suppress one or more negative effects originating from abnormal signals that may be present in the original logs and facilitate the computation of cross-correlation between the first well log 201 and the second well log 202. In some embodiments, performing the data preprocessing 104 can also include normalizing each well log such that each well log has a consistent or equal magnitude. For example, utilizing a Z-score normalization such that both the first well log 201 and the second well log 202 have consistent distribution in terms of magnitude of gamma-ray or other values. In some embodiments, performing the data preprocessing 104 can also include inverting one of the logs, for example the second well log 202, to change a correlation between two well logs from a negative correlation to a positive correlation, if such negative correlation exists. In some embodiments, performing the data preprocessing 104 can also include the correction or removal of abnormal signals in the well logs. For example, outlier values can be removed, missing values can be extrapolated or ignored, and/or flattened or lazy signals caused by stick-and-slip effects can be removed or ignored. In some embodiments, performing the data preprocessing 104 can also include removing or ignoring flattened zones at the start or end of a log from a logging pass. Any other outliers with excessive values can be identified by comparing the signal values to the computed standard variation along a single pass. All abnormal signals can be set to zero, replaced with a constant value so cross-correlation scores are not affected, and/or can be marked for special treatment during the depth matching process.

In some embodiments, performing the pre-shift 105 can include performing a constant pre-shift between the two logs. For example, by calculating a series of correlation coefficients between the first well log 201 and the second well log 202, a constant pre-shift can be determined and performed. The correlation coefficients can be calculated along at least a portion of the logs as depth changes. The offset distance corresponding to the highest correlation coefficient can be used as a constant shift value for the entire target log or portions thereof. For example, the second well log 202 can be pre-shifted. By performing the pre-shift of the second well log 202 in the manner described above, the depth values of the second well log 202 can be more closely aligned with the depth values of the first well log 201. In some embodiments, performing the pre-shift 105 can also include performing wavelet transforms along the entire reference log and target log or portions thereof, to smooth the well logs before calculating the correlation coefficients for determining the pre-shift 105 constant shift value. The pre-shift 105 can roughly synchronize two well logs to reduce the potential maximum shift that can be required to further shift a portion of the target well log, for example second well log 202. The constant shift value can be utilized to shift the target well log, for example the second well log 202, or any other associated logs.

Figure 3:
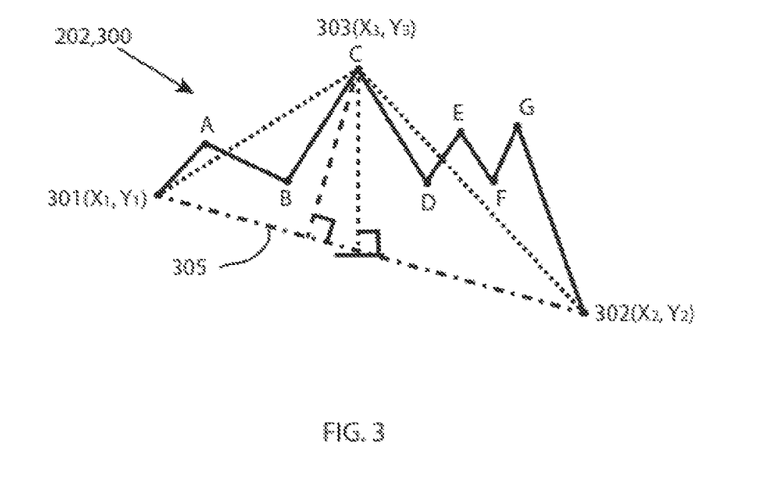
FIG. 3 depicts an illustrative plot of a portion of the data from the second well log shown in FIG. 2.

In some embodiments, the feature picking 106 can be performed by identifying one or more prominent features along the reference well log and the target well log, for example the first well log 201 and the second well log 202, respectively. In embodiments, features along the second well log 202 can be identified from local extrema (i.e., peak and dip) and inflections (i.e., a transition from peak to dip) found by a log-squaring process, which segments the well log to concatenated sections with varying thicknesses where the property of each section can be presented by an interval averaging of the log signals. These features can be defined as anchor points along the second well log 202. Between the identified features, for example features 301 and 302, additional features could be further identified by the so-called Perceptually Important Point (PIP) method. The PIP algorithm is further illustrated as follows. FIG. 3 depicts an illustrative plot of a portion 300 of the data from the second well log 202 shown in FIG. 2. The portion 300 of the data is shown within a window defined by neighboring anchors 301 and 302 in a previous log-squaring step. In some embodiments, interval averaging can be utilized to reduce local minimum and/or maximum within a given interval.

Other feature points can be present between features 301 and 302 and can be selected as features. For example, each of the extremum points A through G, shown along the plot of log data 300, can be selected as anew outstanding feature. However, for processing efficiency, fewer feature points can be selected. For example, to identify other features without selecting every feature point A through G along the plot of log data 300, an equation for a straight line can be determined between the features 301 and 302, for example the straight line 305. A calculation can be performed to determine the distance between each feature point A through G and the straight line 305. The feature point having the largest distance from the straight line 305 can be selected as a feature, for example feature point C also known as feature 303. The features 301, 302, and 303 can be utilized as anchor points from which depth matching calculations can be determined. These anchor points 301, 302, and 303 can include local peaks, local dips, transitions, or any combination thereof. Feature picking 106 can be executed on the first well log 201, the second well log 202, or both. In some embodiments, one or more other methods can be utilized rather than or in concert with the PIP method. For example, the previous log-squaring step can be repeated with a selection of a different threshold parameter.

In some embodiments, to find features along the well log 202, low-frequency variations can be removed from the second well log 202 utilizing a sliding or rolling window analysis and averaging the log data within windows to obtain a smooth log. The smooth log can be subtracted from the second well log 202, to obtain an updated log that does not contain low-frequency variations. For example, the second well log 202 can be divided into quantile bins or windows across the second well log 202 data set. Each of the bins can overlap and have a fixed number of data points within each bin. For each bin, the mean value for all y-values, or some other statistic, can be calculated and the mean values can be utilized for the value of all points within the given bin. The means values can be subtracted from the second well log 202 data set to generate the updated log. The updated log can be utilized for identifying features along the second well log 202. All the features identified, for example features 301, 302, and 303 can be utilized as anchor points for determining corresponding features in the first well log 201.

Figure 4:
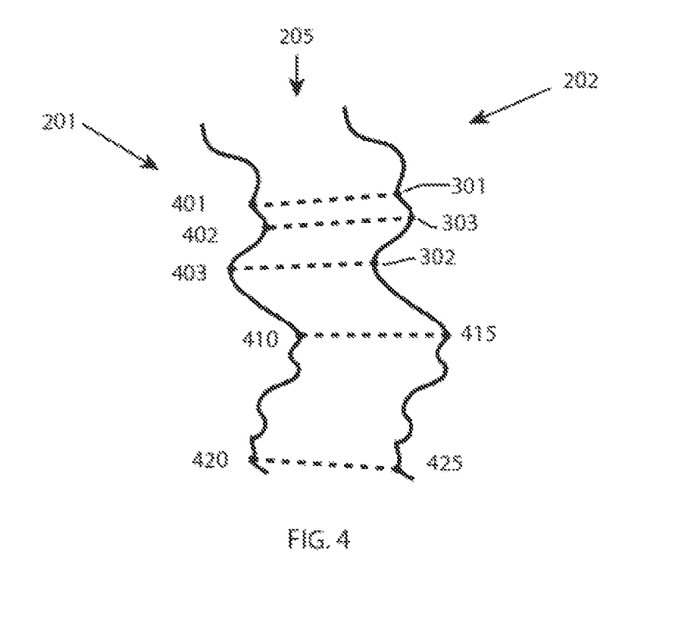
FIG. 4 depicts the illustrative plot from FIG. 2 that further includes a plurality of anchor points identified therein, according to one or more embodiments.

FIG. 4 depicts the illustrative plot from FIG. 2 that further includes a plurality of anchor points identified therein, according to one or more embodiments. Utilizing all the features identified along a given log, for example features 301, 302, and 303 from FIG. 3 and other features identified along the second well log 202 such as features 415 and 425, shift refinement 107 can be performed. For each identified feature 301, 302, 303, 415, and 425 an optimization based on the Pearson's correlation coefficient or a normalized cross-correlation (NCC) can be performed to identify corresponding points in the first well log 201 to generate a list of feature or anchor point pairs. The normalized cross-correlation based optimization can be performed between two well log samples truncated from the first well log and the second well log with a specific window size. Assuming the log sample, q (x), is from the first well log 201, while the log sample, t(x), is from the second well log 202, the cross-correlation coefficient can be computed from equation (1), $$ncc(q, t) = \frac{\sum_x [q(x) - \bar{q}][t(x) - \bar{t}]}{\sqrt{\sum_x [q(x) - \bar{q}]^2 \sum_x [t(x) - \bar{t}]^2}} \quad (1)$$

where x is the index along depth, $\bar{q}$ is the mean of q(x), $\bar{t}$ is the mean of t(x). Sliding the window along x on the first well log 201 to extract a series of q(x) samples, a series of ncc can then be calculated. The highest ncc value(s) can be utilized to identify corresponding points between the first well log 201 and the second well log 202.

For example, corresponding points 401, 402, and 403 for anchor point 301, 302, 303 can be identified within the first well log 201. The aim of optimization can include, for each anchor point picked from one log, for example anchor points 415 and 425, identifying the corresponding anchor point in another log, for example anchor points 410 and 420, to generate a list of anchor point pairs. This optimization problem is often non-unique and depends, at least in part, on the selected window size. In some embodiments, to avoid false matching, for each anchor point in the second well log 202, a multi-scale method can be used. For example, multiple different window sizes can be used to perform optimization in finding matching pairs within two log sets to avoid finding local optimal solutions. The number of different window sizes can be two window sizes, three window sizes, four window sizes, five window sizes, or any number of multiple window sizes depending on the particular data set being optimized and other factors. By utilizing multiple window sizes, a consistent solution for matching corresponding points in two logs, the corresponding points that are found within all-size windows, will remain as an optimized or valid depth matching anchor pair. Anchor point pairs that are not matched in each of the selected window sizes can be considered unreliable matches and discarded.

Normalized cross-correlation (NCC) based optimization can include, for a certain window size and a single anchor point picked on the second well log 202, a window of a particular size centered around the single anchor point selected to intersect the second well log 202 to define a target log segment. On the first well log 201, within a certain range above and below the anchor point of the second well log 202, a window of the same size can be selected to intersect the first well log 201 to define a reference log segment. The target and reference log segments can have the same length due to each window having the same size. An NCC of the target and reference log segments can be calculated. When the window is slid along the first well log 201 with a constant step and the cross-correlation computation is repeated, a list of correlation values can be obtained where the optimal value can reveal the optimal position on the first well log 201 corresponding to the anchor point on the second well log 202. By adopting multiple different window sizes, multiple optimal positions on the first well log 201 can be obtained corresponding to the anchor point on the second well log 202. If the anchor point positions of the first well log 201 under multiple window sizes are consistent, a depth matching anchor pair can be identified and saved.

In previous description, both the first well log 201 and the second well log 202 are not shifted (i.e., stretched or squeezed) during the process of finding anchor point pairs. In some embodiments, shift refinement 107 can optionally include performing shifting to either the first well log 201 or the second well log 202 whenever one or more anchor point pairs are identified. That means the following anchor point pair finding process can be based on the progressively shifted logs. This optional operation can be called dynamic cross-correlation because in the optimization process, the generated intermediate shift table can be progressively and/or dynamically applied to the first well log 201 or second well log 202 (i.e., to stretch or squeeze the log) to calculate the correlation coefficient to improve the optimal solutions for finding the remaining anchor pairs.

In some embodiments, for severely deformed logs, shift refinement 107 can be performed multiple times based on the shift refining results from a previous shift refinement 107 of the same logs. For example, a first shift refinement 107 can be performed and after the results are reviewed, a second shift refinement 107 can be performed. The second shift refinement 107 can focus on invalid anchor points discarded in the first shift refinement 107. These invalid anchor points can be proposed during feature picking 106 but can be difficult to match due to severe deformation and hence discarded. Based on the anchor point pairs obtained from a first refined shift, major parts of the second well log 202 can be shifted and depth matched as described below. Then by performing another shift refinement 107 to the shifted target log, valid anchor point pairs can be re-selected from the invalid ones discarded during feature picking 106 or shift refinement 107. This operation can further improve the correlation between the first well log 201 and the shifted target log. Final anchor point pairs can be generated from the combination of results from the first and second shift refinements 107.

Generating a shift table 108 can be performed utilizing the constant depth shift obtained from pre-shift 105, or the anchor point pairs identified during shift refinement 107. The generated shift table 108 can be used for changing or shifting the depth of the anchor point from the second well log 202 to the depth of the corresponding anchor point in the first well log 201, for example for the first well log 201 and the second well log 202. This can provide a depth mapping from one log to another, as shown in FIG. 4, where the dashed lines represent the mapping of anchor points between the two well logs 201 and 202. When the generated shift table is applied to the second well log 202, between each two adjacent anchor points, a linear stretch or squeeze can be applied to the second well log 202 to form a new shifted target log. The new shifted target log can then be considered depth matched to the first well log 201.

Applying the generated shift table 110 can be performed. The generated shift table 110 can be applied to other logs that are acquired from the same tool string with the second well log 202, for example all the logs taken at the same time the second well log 202 was taken. After applying the generated shift table 110 to all the logs taken at the same time the second well log 202 was taken, all those logs can be considered depth matched to the corresponding logs associated with the first well log 201, for example all the corresponding logs taken at the same time as first well log 201.

Analyzing geological related data in the depth matched well logs 111 to assess or identify geological structures or strata along the length of the well bore to identify hydrocarbon deposits can be performed using known techniques as would be understood by those skilled in the art. In some embodiments, a graphical representation of the depth matched well log data from the first well log and the second well log can be output for visual inspection to assess geological strata to identify hydrocarbon deposits. In some embodiments, the depth matched well logs can also be provided to external users and/or other computer algorithms to analyze hydrocarbon related data present in the depth matched well logs. In some embodiments, the depth matched well logs can be assessed to identify geological strata, hydrocarbon deposits therein, formation structures, fault locations, and/or transitions from one rock layer to another rock layer. In some embodiments, the depth matched well logs can be utilized to determine perforation locations along the well-bore to conduct one or more perforation operations or other formation operations. In some embodiments, the depth matched well logs can also be provided to one or more machine learning algorithms to perform quality assurance checks for training the machine learning algorithms that can be utilized to depth match well log data and/or analyze hydrocarbon related data to assess geological strata, to identify hydrocarbon deposits, formation structures, fault locations, transitions from one rock layer to another rock layer, and/or for determining perforation locations along the well-bore and conducting one or more perforation operation, coring operation, or other formation testing or completion operation. In some embodiments, a tool string can be transitioned to a location within the well bore based, at least in part, on the analyzed geological data. For example, the identified geological structures can be utilized to transition a tool string to a location within the well bore based, at least in part, on the location of one or more geological structures.

Figure 5:
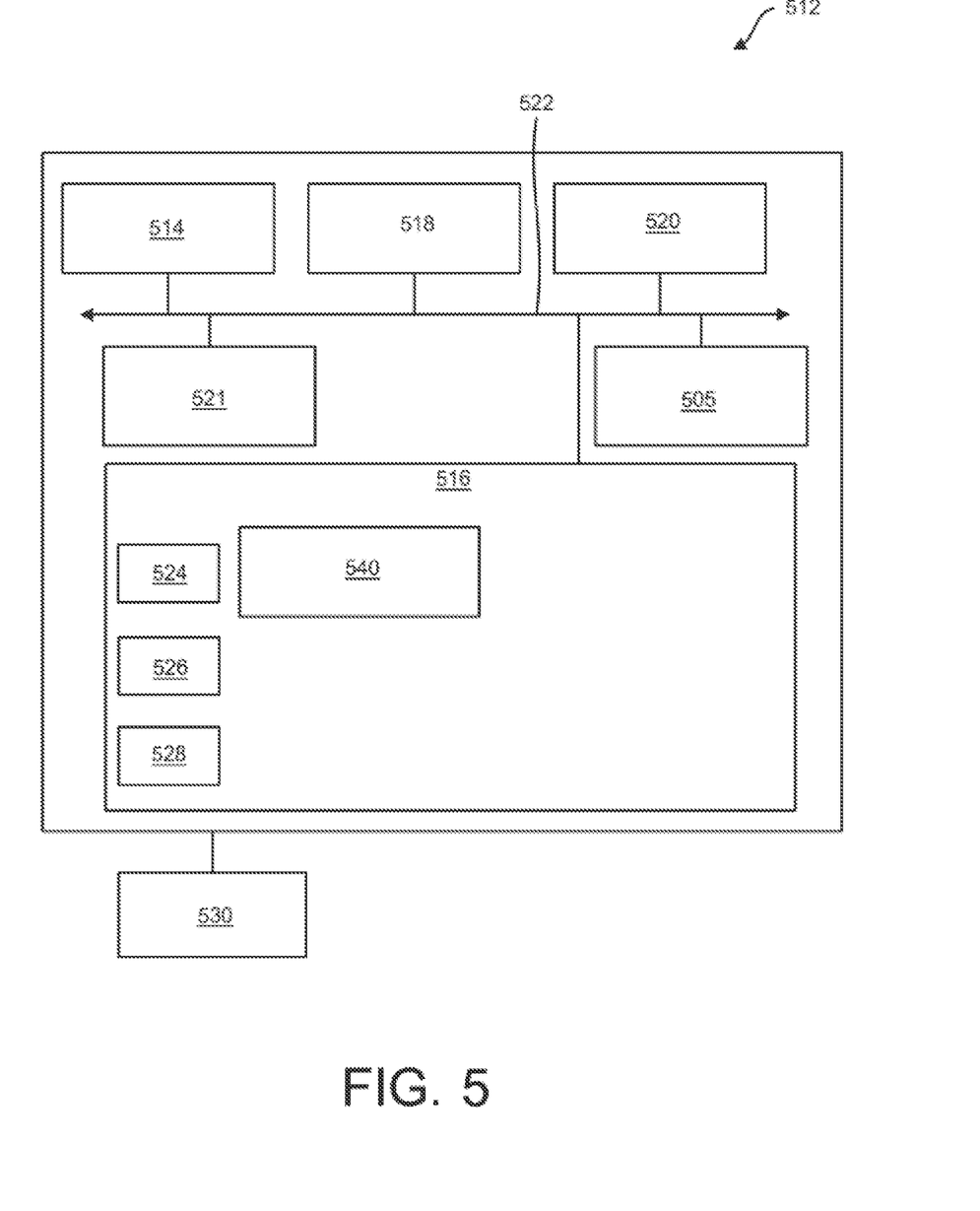
FIG. 5 depicts a schematic of an illustrative computing system for performing depth matching between well logs, according to one or more embodiments described.

FIG. 5 depicts a schematic of an illustrative computing system 512 for performing depth matching between well logs, according to one or more embodiments. One or more chips, for example chips 505 and/or 521, can be or can include field-programmable gate arrays ("FPGAs"), application specific integrated circuits ("ASICs"), chiplets, Multi-Chip-Modules, central processing units ("CPUs"), and/or system-on-chips ("SOCs"), to name a few. The chip can be used in a wide-range of applications, including but not limited to auto emission control, environmental monitoring, digital voice recorders, or other digital processing systems. ASICs can include entire microprocessors, memory blocks including read only memory (ROM), random access memory (RAM), erasable programmable read only memory (EPROM), electrically erasable programmable read only memory (EEPROM), flash memory and other building blocks and can be known as system-on-chip ("SoC").

To achieve its desired functionality, the computing system 512 can include various hardware and software components. Among these components can be one or more processors 514 and a depth matching controller 540. These hardware components can be interconnected through the use of a number of electrical connections, busses, and/or network connections. In one embodiment, the processor 514, the chip 505, the chip 521, and the depth matching controller 540 can be communicatively coupled via a bus 522. The bus 522 can be or include any know computing system bus. The depth matching controller 540 can be internal to a data storage device 516.

The chip 505, the chip 521, and/or the depth matching controller 540 can include, either separately or in some combination, the necessary software and hardware, including tangible, non-transitory computer readable medium (not shown), for performing depth matching between well log.

The depth matching controller 540 can be integrated into the chip 505, the chip 521, and/or the processor 514. The chip 505 and/or the chip 521 can be integrated into the processor 514. Although depth matching controller 540 is depicted as being internal to the data storage device 516, in other examples, the controller module 534 can be a peripheral device (not shown) coupled to the computing system 512 or included within a peripheral device (not shown) coupled to the computing system 512. In other examples, the depth matching controller 540 can be a peripheral device (not shown) coupled to the computing system 512 or included within a peripheral device (not shown) coupled to the computing system 512.

The depth matching controller 540 can include instructions that when executed by the depth matching controller 540 can cause the depth matching controller 540 to perform depth matching between two well logs, for example well log 201 and well log 202, with reference to FIG. 2. Referring to FIG. 1, the instructions can, when executed by the depth matching controller 540, cause the depth matching controller 540 to implement at least the functionality of selecting two well logs for depth matching 103, performing data preprocessing 104, performing a pre-shift 105, feature picking 106, shift refinement 107, generating a shift table 108, applying the generated shift table 110 to one or more logs within the well log data taken in the same well log pass, and analyzing the depth matched well logs 111 to assess geological strata to identify hydrocarbon deposits. The instructions can, when executed by the depth matching controller 540, cause the depth matching controller 540 to output a graphical representation of the depth matched well log data from the first well log and the second well log for visual inspection and other analyses to assess geological strata to identify hydrocarbon deposits. The instructions can, when executed by the depth matching controller 540, cause the depth matching controller 540 to provide the depth matched well logs to one or more machine learning algorithms to perform quality assurance checks for training the machine learning algorithms that can be utilized to depth match well log data and/or analyze hydrocarbon related data to assess geological strata to identify hydrocarbon deposits. Returning to FIG. 5, in examples the depth matching controller 540 can work in conjunction with the processor 514 to implement the functionality described above. In examples, the depth matching controller 540 can execute firmware code stored on the computing system 512, such as on the chip 505, the chip 521, and/or the processor 514. The functionality of the computing system 512 and/or the depth matching controller 540 can be in accordance with the methods of the present specification described herein. In the course of executing code, the processor 514 and/or the depth matching controller 540 can receive input from and provide output to a number of the remaining hardware units.

The computing system 512 can be implemented in an electronic device. Examples of electronic devices include servers, desktop computers, laptop computers, cloud based computers, personal digital assistants ("PDAs"), mobile devices, smartphones, gaming systems, and tablets, among other electronic devices. The computing system 512 can be utilized in any data processing scenario including, standalone hardware, mobile applications, through a computing network, or combinations thereof. Further, the computing system 512 can be used in a computing network, a public cloud network, a private cloud network, a hybrid cloud network, other forms of networks, or combinations thereof. In one example, the methods provided by the computing system 512 are provided as a service by a third party.

To achieve its desired functionality, the computing system 512 can include various other hardware components. Among these other hardware components can be a number of data storage devices or tangible, non-transitory computer readable medium 516, a number of peripheral device adapters 518, and a number of network adapters 520. These hardware components can be interconnected through the use of a number of electrical connections, busses, and/or network connections. In one example, the processor 514, data storage device 516, peripheral device adapters 518, and a network adapter 520 can be communicatively coupled via a bus, for example the bus 522 as depicted in FIG. 5 or via a separate bus, not shown.

The chip 505, the chip 521, and/or the processor 514 can include the hardware and/or firmware/software architecture to retrieve executable code from the data storage device 516 and execute the executable code. The executable code can, when executed by the chip 505, the chip 521, and/or the processor 514, cause the chip 505, the chip 521, and/or the processor 514 to implement at least the functionality of selecting two well logs for depth matching 103, performing data preprocessing 104, performing a pre-shift 105, feature picking 106, shift refinement 107, generating a shift table 108, and applying the generated shift table 110 to one or more logs within the well log data taken in the same well log pass.

The data storage device 516 can store data such as executable program code that is executed by the processor 514, the depth matching controller 540, or other processing devices. The processor 514 can be a central processing unit that is to execute an operating system in the computing system 512. As will be discussed, the data storage device 516 can specifically store computer code representing a number of applications that the processor 514 and/or the depth matching controller 540 can execute to implement at least the functionality described herein.

The data storage device 516 can include various types of memory modules, including volatile and nonvolatile memory. For example, the data storage device 516 of the present example can include Random Access Memory ("RAM") 524, Read Only Memory ("ROM") 526, and Hard Disk Drive ("HDD") storage 528. Many other types of memory can also be utilized, and the present specification contemplates the use of many varying type(s) of memory in the data storage device 516 as can suit a particular application of the principles described herein. In certain examples, different types of memory in the data storage device 516 can be used for different data storage needs. For example, in certain examples the processor 514 can boot from Read Only Memory ("ROM") 526, maintain nonvolatile storage in the Hard Disk Drive ("HDD") memory 528, and execute program code stored in Random Access Memory ("RAM") 524. In examples, the chip 505, and the chip 521 can boot from the Read Only Memory ("ROM") 526.

The data storage device 516 can include a computer readable medium, a computer readable storage medium, or a non-transitory computer readable medium, among others. For example, the data storage device 516 can be, an electronic, magnetic, optical, electromagnetic, infrared, or semiconductor system, apparatus, or device, or any suitable combination of the foregoing. More specific examples of the computer readable storage medium can include, for example, the following: an electrical connection having a number of wires, a portable computer diskette, a hard disk, a RAM, a ROM, an EPROM, a Flash memory, a portable compact disc read-only memory ("CD-ROM"), an optical storage device, a magnetic storage device, or any suitable combination of the foregoing. In the context of this document, a computer readable storage medium can be any tangible medium that can contain, or store computer usable program code for use by or in connection with an instruction execution system, apparatus, or device. In another example, a computer readable storage medium can be any non-transitory medium that can contain or store a program for use by or in connection with an instruction execution system, apparatus, or device.

The hardware adapters 518, 520 in the computing system 512 can enable the processor 514 to interface with various other hardware elements, external and internal to the computing system 512. For example, the peripheral device adapters 518 can provide an interface to input/output devices, such as, for example, a display device 530, a mouse, and/or a keyboard. The peripheral device adapters 518 can also provide access to other external devices such as an external storage device, a number of network devices such as, for example, servers, switches, and routers, client devices, other types of computing devices, and combinations thereof.

The display device 530 can be provided to allow a user of the computing system 512 to interact with and implement the functionality of the computing system 512. Examples of display devices 530 can include a computer screen, a laptop screen, a mobile device screen, a personal digital assistant ("PDA") screen, and/or a tablet screen, among other display devices 530.

The peripheral device adapters 518 can also create an interface between the processor 514 and the display device 530, a printer, or other media output devices. The network adapter 520 can provide an interface to other computing devices within, for example, a network, thereby enabling the transmission of data between the computing system 512 and other devices located within the network. The network adapter 520 can provide an interface to an external telecommunications network such as a cellular phone network or other radio frequency enabled network, thereby enabling the transmission of data between the computing system 512 and other external devices such as an external storage device, a number of network devices such as, for example, servers, switches, and routers, client servers, radio frequency enabled devices, other client devices, other types of computing devices, and combinations thereof.

The computing system 512 can further includes a number of modules used in the implementation of the systems and methods described herein. The various modules within the computing system 512 can include executable program code that can be executed separately. In this example, the various modules can be stored as separate computer program products. In another example, the various modules within the computing system 512 can be combined within a number of computer program products; each computer program product including a number of the modules.

Figure 6:
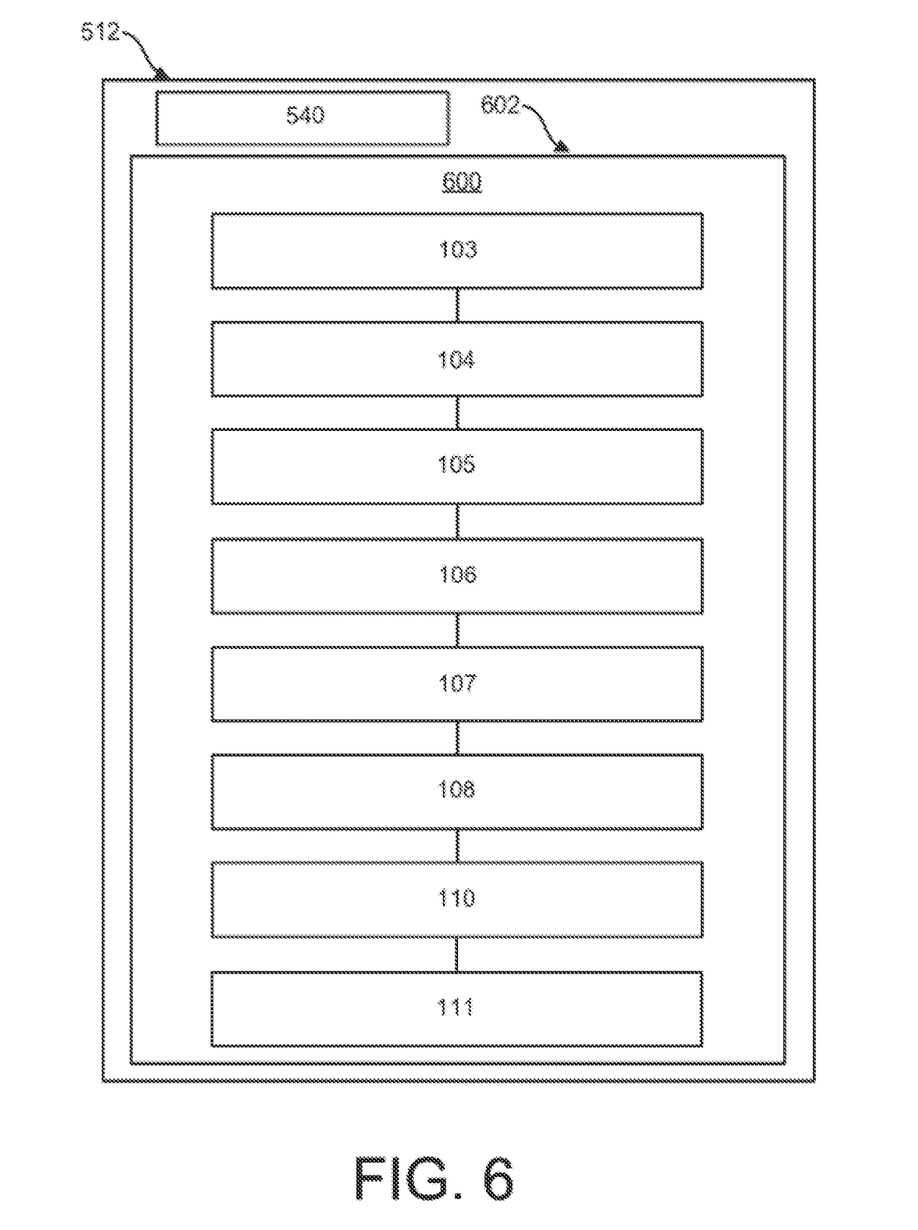
FIG. 6 depicts an illustrative computing device that includes a depth matching controller and a non-transitory computer-readable medium that includes computer executable instructions stored thereon within the computing system of FIG. 5, according to one or more embodiments.

FIG. 6 is a computing device including the depth matching controller 540 and a non-transitory computer-readable medium 602 including computer executable instructions 600 stored thereon within the computing system of FIG. 5, according to one or more embodiments. When the computer executable instructions 600 are executed by the depth matching controller 540, the computer executable instructions 600 can cause the depth matching controller 540 to select two well logs for depth matching (block 103); perform data preprocessing (block 104); perform a pre-shift (block 105); perform feature picking (block 106) one or more features in to each of the well logs; perform shift refinement (block 107), generate a shift table (block 108), apply the generated shift table (block 110) to one or more logs within the well log data taken in the same well logging pass; and analyze the depth matched well logs 111 to assess geological strata to identify hydrocarbon deposits. For example, when the computer executable instructions 600 are executed by the depth matching controller 540, the computer executable instructions 600 can cause the depth matching controller 540 to generate one or more shift tables for one or more pairs of well log data sets taken from the same well, apply the generated shift table (block 110) to the one or more logs, and analyze the resulting depth matched well logs to identify hydrocarbon deposits. The computer executable instructions 600 can cause the depth matching controller 540 to output a graphical representation of the depth matched well log data from the first well log and the second well log for visual inspection and other analyses to assess geological strata to identify hydrocarbon deposits. The computer executable instructions 600 can cause the depth matching controller 540 to provide the depth matched well logs to one or more machine learning algorithms to perform quality assurance checks for training the machine learning algorithms that can be utilized to depth match well log data and/or analyze hydrocarbon related data to assess geological strata to identify hydrocarbon deposits.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. A process for well log depth matching, comprising:
   normalizing a first well log from a first logging pass obtained within a well bore and a second well log from a second logging pass obtained within the well bore;
   performing a pre-shift by calculating a series of correlation coefficients between the first well log and the second well log and utilizing an offset distance corresponding to a highest correlation coefficient as a constant shift value for the second well log;
   performing feature picking to identify one or more features along the second well log;
   performing normalized cross-correlation based optimization between the first well log and the second well log to match the one or more features along the second well log to the same one or more features of the first well log;
   generating a shift table for depth shifting the one or more features of the second well log to match the depths of the corresponding one or more features in the first well log;
   applying the generated shift table to the second well log to depth match the second well log to the first well log; and
   transiting a tool string to a location within the well bore based, at least in part, on geological related data in the depth matched first and second well logs.

2. The process of claim 1, further comprising outputting a graphical representation of the depth matched first and second well logs.

3. The process of claim 1, further comprising providing the depth matched well logs to train one or more machine learning algorithms utilized for depth matching or analyzing hydrocarbon related data.

4. The process of claim 1, further comprising using the depth matched well logs to perform quality assurance checks on the one or more machine learning algorithms utilized for depth matching or analyzing hydrocarbon related data.

5. The process of claim 1, wherein the depth matched first and second well logs are analyzed to assess geological strata.

6. The process of claim 1, wherein the depth matched first and second well logs are analyzed to identify hydrocarbon deposits.

7. The process of claim 1, wherein the depth matched first and second well logs are analyzed to identify formation structures.

8. The process of claim 1, wherein the depth matched first and second well logs are analyzed to identify fault locations.

9. The process of claim 1, wherein the depth matched first and second well logs are analyzed to identify transitions from one rock layer to another rock layer.

10. The process of claim 1, wherein the depth matched first and second well logs are analyzed to determine one or more formation locations along the well bore.

11. The process of claim 1, wherein the first and second well logs are each gamma-ray logs.

12. The process of claim 1, wherein the first well log is a sonic log and the second well log is a density log.

13. The process of claim 1, wherein the first well log is a sonic log acquired with a monopole source and the second well log is acquired with a dipole source.

14. The process of claim 1, wherein the first well log and the second well log have different sampling rates.

15. The process of claim 1, wherein the first well log and the second well log have different magnitudes in terms of value.

16. The process of claim 1, wherein normalizing the first well log and the second well log comprises resampling the first well log and the second well log to a pre-defined constant rate.

* * * * *